3,574,706
PROCESS FOR THE PREPARATION OF ESTERS
OF DICARBOXYLIC ACIDS
Guidobaldo Cevidalli, Seveso, and Giuseppe Caprara and
Giorgio Montorsi, Milan, Italy, assignors to Montecatini
Edison S.p.A., Milan, Italy
No Drawing. Filed Mar. 6, 1968, Ser. No. 710,743
Claims priority, application Italy, Mar. 7, 1967,
13,447/67
Int. Cl. C07c 69/44, 69/50, 69/80
U.S. Cl. 260—475                            8 Claims

ABSTRACT OF THE DISCLOSURE

Process for the preparation of esters of dicarboxylic acids (especially maleic acid, adipic acid, pimelic acid, sebacic acid and phthalic acids), wherein the alkali-metal salt of the acid is reacted at 120° to 190° C. in suspension with a secondary alkyl halide having 4 to 15 carbon atoms in the presence of a catalyst consisting essentially of pyridine, sodium or potassium iodide and an organic catalysis promoter (e.g., phenol, hydroquinone, chlorobenzene, nitrobenzene, chlorophenol, cresol, dimethylaniline) or monoesters of dicarboxylic acids (e.g., as formed in a previous reaction ssytem).

---

Our present invention relates to a process for the preparation of esters of dicarboxylic acids by the reaction of alkyl halide with alkali-metal salts of the dicarboxylic acids.

The production of dicarboxylic acid esters, which are desirable because of their suitability as plasticizers for synthetic resins and elastomeric materials, using a reaction between an alkyl halide and a dicarboxylic acid salt is already known. In these earlier systems, the catalyst has generally been constituted of an organic tertiary base which may be used with or without an alkali-metal iodide. Such processes involve significant disadvantages when long-chain secondary alkyl halides are employed, these disadvantages including the extreme slowness of the esterification reaction, the formation of large quantities of olefins as a result of thermally induced dehydrohalogenation when high temperatures are employed in order to increase the esterification rate, and the like.

It is, therefore, an important object of the present invention to provide an improved process for the production of the diesters of dicarboxylic acid which avoids the drawbacks mentioned earlier.

Another object of the present invention is to provide a process for producing esters of dicarboxylic acids at relatively high rates and good yields.

Yet another object of this invention is to provide a system for producing dicarboxylic acid esters in which the conversion of the alkyl compound to the ester is increased by comparison with earlier systems and which can be carried out at relatively low temperatures.

In accordance with the present invention, the esterification of a dicarboxylic acid is carried out by reacting an alkali-metal salt of the dicarboxylic acid with a secondary alkyl halide having 4 to 15 carbon atoms in the presence of a catalyst system which comprises, in addition to pyridine and a sodium or potassium iodide, a catalyst promoter which may be a benzene or substituted benzene compound or a monoester of an organic dicarboxylic acid. The esterification reaction is carried out at a temperature between 120° to 190° C. (preferably 150 to 170° C.).

According to a more specific feature of this invention, the alkali-metal salt or ester of the dicarboxylic acid is suspended in finely divided form in a stoichiometrically equivalent quantity of a secondary alkyl halide or a mixture of such halides having at least 4 carbon atoms and not more than 15 carbon atoms in the alkyl chain. The catalyst system is then added to this suspension. The catalyst system comprises, as indicated earlier, three principal components including the pyridine base, an alkali-metal halide, and the catalyst promoter. When the reaction system is maintained at a temperature of 120° to 190° C., the reaction is carried out, whereupon the alkali-metal halide is filtered from the suspension with the liquid base being washed with water to eliminate water-soluble impurities, and thereafter subjected to distillation in vacuum. The desired esters constitute the residue of the vacuum installation.

As to the dicarboxylic salts with which the reaction is operative, we have found that best results are obtained when the alkali-metal salts are salts of sodium and potassium and the dicarboxylic acids are the alpha-omega dicarboxylic acids having 2 to 12 carbon atoms in the molecular skeleton between the carboxyl groups, or the dicarboxylic acids of the benzene series. Optimum results are obtainable with the sodium or potassium salts of maleic acid, adipic acid, pimelic acid, sebacic acid, phthalic acid, isophthalic acid and terephthalic acid. The most desirable reactant, however, is the sodium salt of phthalic acid. The secondary alkyl halides employed in the reaction may be the secondary alkyl bromides or secondary alkyl chlorides having 4 to 15 carbon atoms in the carbon chain which may be linear or branched. The alkyl halides may be used individually or in mixtures as desired. Particularly effective results have been obtainable with linear secondary chlorodecanes and with linear secondary chloroundecanes and mixtures thereof.

The organic catalysis promoters of the present invention may be selected from the group consisting of phenols (phenols and substituted phenols), chlorobenzenes, nitrobenzenes, aromatic N-alkyl-substituted amines and the acid esters of dicarboxylic acids (i.e., the monoesters). Suitable compounds of this type have been found to be the monoesters of phthalic acid, isophthalic acid, terephthalic acid, maleic acid, adipic acid, pimelic acid and sebacic acid, with the esterifying group having an alkyl chain of 4 to 15 carbon atoms. Other compounds suitable for use in the system of the present invention include para-chlorophenol, para-cresol and N,N-dimethylaniline. When the catalyst promoter is to be a monoester of a dicarboxylic acid, we prefer to employ the monoester corresponding to the diester to be produced by the system.

According to a further feature of this invention, the catalyst promoter is a fraction of the raw ester (reaction product containing mono and diester) obtained from a previous similar reaction. The catalyst system preferably is supplied so that the concentration of pyridine ranges between 0.5 and 20% by weight, the sodium or potassium iodide concentration ranges between 0.1 and 2% by weight and the catalyst promoter in present in quantities up to about 10% by weight (preferably 0.1 to 2% with promoters other than the monoesters) with respect to the reaction system. When the monoesters of the dicarboxylic acids are used, quantities higher than 2% by weight are preferable. The dicarboxylic acid salts and the alkyl halides are present in stoichiometric equivalents.

The following examples show the best mode presently known to us for carrying out the invention in practice.

EXAMPLE 1

In a tubular reactor provided with a stirrer, a thermometer, a reflux cooler and an electric heating oven, 21 grams of finely divided sodium phthalate was suspended under strong stirring, in 38.1 grams of a mixture of secondary linear chloroundecanes (having a boiling point at 5 mm.

Hg=89°–90° C. and a greater than 99% titer as determined by gas chromatography).

To this suspension were then added 9 grams of pyridine, 0.2 gram of potassium iodide and 0.5 gram of phenol. The mixture is then reacted for 6 hours at 160° C.

At the end of the reaction, the mixture thus obtained is filtered; the solid residue is washed with methylene chloride. 14.8 grams of a solid residue are obtained constituted of 64% by weight sodium chloride, 19% by weight sodium acid phthalate and 17% by weight sodium phthalate as well as traces of the sodium salt of the phthalic monoester of undecane.

The solvent is then removed from the organic phase, after washing with water and dehydration; the residual liquid is then subjected to vacuum distillation. 10.8 grams of distillate is collected; the distillate is constituted of 37% by weight undecane and 63% of unreacted chloroundecane; 32.9 grams of a distillation residue remained and represented the reaction product.

The distillation residue, subjected to analysis for the —COOH and —COOR groups, was found to be constituted of 94% by weight undecane phthalic diester, 5% by weight of the phthalic monoester, together with some small quantities of phthalic anhydride.

The net yield in ester, referred to chloroundecane conversion, is about 83%; the conversion of chloroundecane is about 81%. When carrying out the reaction under the same conditions but in the absence of a catalysis promoter, one obtains a conversion of chloroundecane below 20%.

EXAMPLES 2–8

These tests have been carried out by means of the same apparatus and following the same procedures described in Example 1. We here used secondary linear chloroparaffins having a titer above 99% as determined by gas chromatography.

The results and operational conditions are reported on the following table:

By carrying out the reaction under the same conditions but in the absence of the dodecyl acid phthalate, one obtains a conversion in chlorodecane less than 20%.

EXAMPLE 10

A suspension was prepared by using the quantities and starting reactants reported in Example 9. To this suspension was then added 9 grams of pyridine, 0.2 gram of potassium iodide and 10 grams of the distillation residue obtained from the separation of the reaction products of the preceding example. This distillation residue contained about 20% by weight phthalic monoester. The mixture was permitted to react for 7 hours at 160° C. We thus obtained a conversion of chlorodecane of 90%; the net yield in phthalic ester referred to the chlorodecane amounted to 85%.

EXAMPLE 11

In the same equipment as that described in Example 1, 21 grams of sodium phthalate was suspended in 38.1 grams of a mixture of secondary linear chloroundecane (with a B.P. at 5 mm. Hg=89–90° C. and a titer greater than 99% as determined by gas chromatography).

To this suspension we added 9 grams of pyridine, 0.1 gram of potassium iodide and 10 grams of the distillation residue obtained by the separation of the reaction products of Example 1. The mixture was then permitted to react for 7 hours at 160° C. and the reaction products were separated by following the procedures described in Example 1. Thereby a conversion of 69% in chloroundecane was obtained while the net yield in ester, calculated with respect to the chloroundecane, amounted to 82%.

EXAMPLE 12

The test described in Example 11 was repeated, using as a catalysis promoter 10 grams of the distillation residue obtained in Example 11. Said distillation residue contained 14% by weight of the monoester; a conversion in chloro-

TABLE

| Ex. | Sodium phthalate, grams | Linear secondary chloroparaffin, grams | Catalyst Pyridine, grams | Potassium iodide, grams | Catalysis promoter, grams | Reaction temperature, °C. | Reaction time, hours | Conversion of chloroparaffin, percent | Net yield of ester calculated with respect to converted chloroparaffin, percent | Conversion of chloroparaffin obtained by carrying out the reaction under same conditions but in absence of the catalysis promoter |
|---|---|---|---|---|---|---|---|---|---|---|
| 2 | 18.8 | A 41   | 2.5 | 1   | ¹ 0.5 | 135 | 7.5 | 26 | 77 | Less than 5%. |
| 3 | 21   | B 35.3 | 9   | 0.2 | ² 1.1 | 160 | 8   | 84 | 81 | Less than 20%. |
| 4 | 18.8 | C 41   | 2.5 | 1   | ³ 1.2 | 160 | 8   | 70 | 74 | Do. |
| 5 | 18.8 | D 41   | 2.5 | 1   | ⁴ 1   | 160 | 8   | 45 | 67 | Do. |
| 6 | 18.8 | E 41   | 2.5 | 1   | ⁵ 0.5 | 160 | 8   | 56 | 68 | Do. |
| 7 | 21   | F 38.1 | 9   | 1   | ⁶ 1   | 160 | 7   | 90 | 77 | Do. |
| 8 | 21   | G 38.1 | 9   | 1   | ⁷ 1   | 160 | 6.5 | 89 | 70 | Do. |

A Mixture of chloroundecanes (B.P. at 5 mm. Hg=89°–90° C.).
B Mixture of chlorodecanes (B.P. at 10 mm. Hg=84°–85° C.).
C Mixture of chloroundecanes (B.P. 5 mm. Hg=89°–90° C.).
D and E equal C
F Mixture of chloroundecanes (B.P. 5 mm. Hg=89°–90° C.).
G Mixture of chloroundecanes (B.P. 5 mm. Hg=89°–90° C.).
¹ Equals phenol.
² Equals chlorobenzene.
³ Equals nitrobenzene.
⁴ Equals N,N-dimethylaniline.
⁵ Equals hydroquinone.
⁶ Equals p-chlorophenol.
⁷ Equals p-cresol.

EXAMPLE 9

In the same reactor as that described in Example 1, we suspended in 35.5 grams of a mixture of secondary linear chlorodecanes (with a B.P., at 10 mm. Hg of 84–85° C. and a titer above 99% determined by gas chromatography), 21 grams of sodium phthalate. To this suspension were then added 9 grams of pyridine, 0.2 gram of potassium iodide and 5 grams of decyl acid phthalate (obtained by treating phthalic anhydride with a mixture of secondary linear decanols at 95° C.). The mixture is permitted to react for 7 hours at 160° C. The products obtained at the end of the reaction were separated by following the procedure described in Example 1. The conversion of chlorodecane was 81%, while the net yield in ester, calculated with respect to the converted chlorodecane, was 90%.

undecane of 93% was obtained. The yield in diester calculated with respect to the chloroparaffin amounted to 84%.

EXAMPLE 13

21 grams of sodium phthalate were suspended in 35.3 grams of a mixture of secondary linear chlorodecanes (with a B.P. at 10 mm. Hg=84–85° C. and a titer above 99% as determined by gas chromatography) in the apparatus described in Example 1.

To this suspension were added 9 grams of pyridine, 0.2 gram of potassium iodide and 10 grams of the distillation residue obtained by the separation of the reaction products of Example 3. This distillation residue contained 17% by weight of monoester. The mixture was then permitted to react for 7 hours at 160° C. and the reaction products were then separated according to the procedures of Example 1.

A conversion in chlorodecane of 90% was obtained, while the net yield in ester, calculated with respect to the chloroparaffin, amounted to 85%.

We claim:

1. A process for producing a dicarboxylic-acid ester comprising the step of reacting a sodium or potassium salt of a dicarboxylic acid selected from the group which consists of alpha-omega aliphatic acids having 2 to 12 carbon atoms in the molecular skeleton between the carboxyl groups and benzene dicarboxylic acids in suspension with at least one secondary alkyl chloride or alkyl bromide having 4 to 15 carbon atoms in the presence of a catalyst system consisting essentially of pyridine, sodium or potassium iodide and an organic catalyst promoter compound selected from the group which consists of phenol, hydroquinone, chlorobenzene, nitrobenzene, parachlorophenol, paracresol, N,N-dimethylaniline and monoesters corresponding to the dicarboxylic acid esters produced, at a temperature between substantially 120° C. and 190° C.

2. The process defined in claim 1 wherein said salt is sodium maleate, sodium adipate, sodium pimelate, sodium sebacate, sodium isophthalate, sodium terephthalate or sodium phthalate.

3. The process defined in claim 1 wherein said alkyl chloride is a linear chloroundecane or a chlorodecane.

4. The process defined in claim 1, further comprising the steps of initially forming a monoester of a dicarboxylic acid and employing said monoester as the organic catalyst promoter compound for a subsequent esterification of a dicarboxylic acid.

5. The process defined in claim 4 wherein said monoester is separated from an earlier corresponding reaction system for use in a subsequent similar reaction system.

6. The process defined in claim 1 wherein said organic catalyst promoter compound is a monoester of phthalic acid, isophthalic acid, terephthalic acid, maleic acid, adipic acid, pimelic acid or sebacic acid.

7. The process defined in claim 1 wherein the reaction temperature is maintained between 150° C. and 170° C.

8. The process defined in claim 1 wherein said pyridine is added to the reaction system in an amount such that its concentration therein ranges between 0.5 and 20% by weight, potassium iodide is added to the reaction system in an amount such that its concentration therein ranges between substantially 0.1 and 2% by weight, and said organic catalyst promoter compound is present in the reaction system at least during part of the reaction in an amount ranging between 0 and 10% by weight, said salt of said dicarboxylic acid and said alkyl chloride or bromide being present in substantially stoichiometric relationship in said reaction system.

References Cited
UNITED STATES PATENTS 3,341,575  9/1967  Fierce et al. _____ 260—485

LORRAINE A. WEINBERGER, Primary Examiner

E. J. SKELLY, Assistant Examiner

U.S. Cl. X.R.

260—485